United States Patent Office.

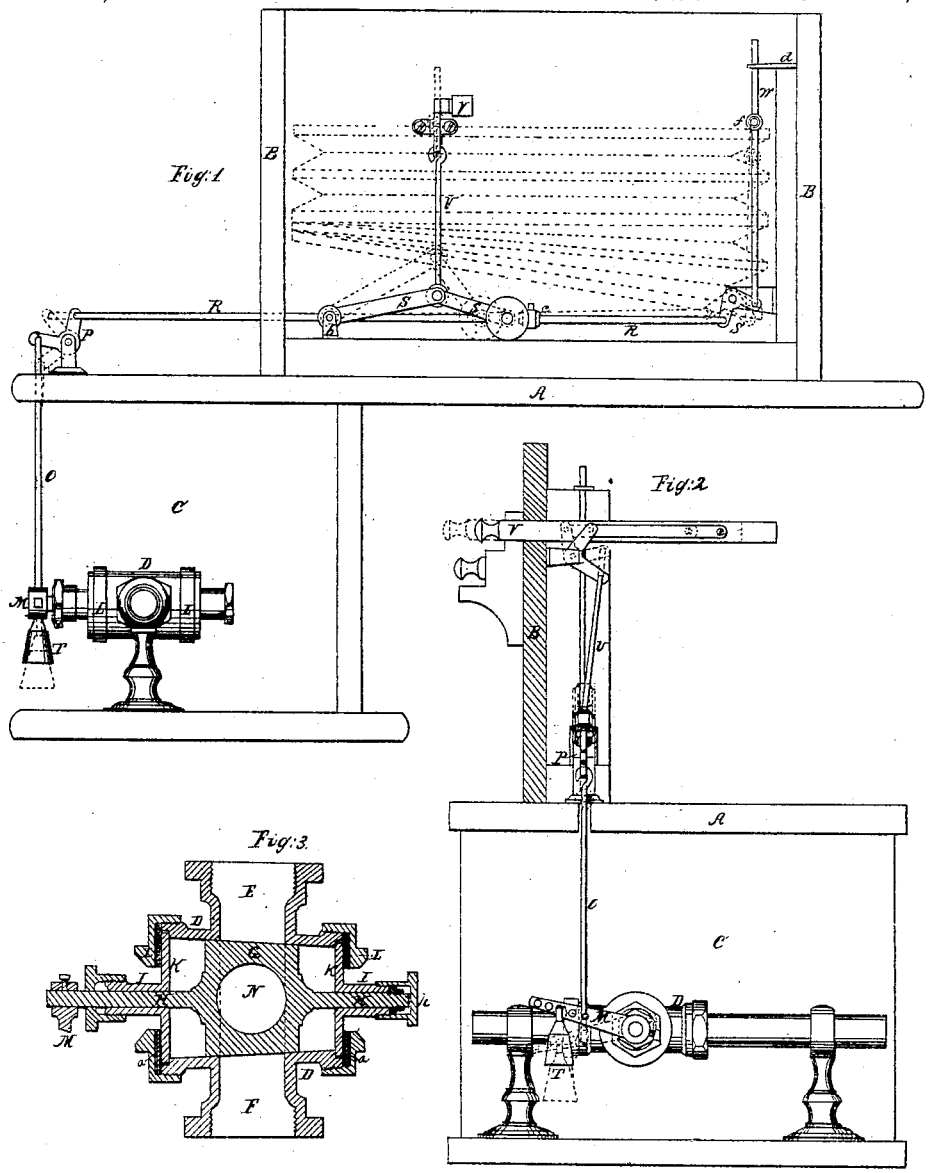

WILLIAM H. TOPHAM, OF NEW HAVEN, CONNECTICUT, ASSIGNOR TO HIMSELF AND PECK, BROTHERS & CO., OF SAME PLACE.

Letters Patent No. 65,452, dated June 4, 1867.

IMPROVEMENT IN MOTOR REGULATORS AND REGISTER ATTACHMENTS FOR ORGANS.

The Schedule referred to in these Letters Patent and making part of the same.

TO ALL WHOM IT MAY CONCERN:

Be it known that I, WILLIAM H. TOPHAM, of New Haven, in the county of New Haven, and State of Connecticut, have invented a new and improved Motor Regulator and Register Attachment for Organs; and I do hereby declare the following, when taken in connection with the accompanying drawings, and the letters of reference marked thereon, to be a full, clear, and exact description of the same, and which said drawings constitute part of this specification, and represent, in—

Figure 1, a sectional side view of the apparatus looking toward the front of the organ.

Figure 2, a sectional end view; and in

Figure 3, a central section of the regulator valve.

This invention has special reference to the attachment and regulation to operate the bellows of organs by water-power, and designed more particularly for the use of water-motors; and consists, first, in the peculiar construction of the valve; second, in combining the valve with one of the registers or "stops" of the organ, so that the organist may, by operating the stop in like manner as other stops, let on or cut off the water which supplies the power; and, third, the mechanism whereby the bellows itself is made self-regulating, that is to say, to regulate the power to keep the bellows filled to nearly a given point.

To enable others skilled in the art to construct and use my improvement, I will proceed to describe the same as illustrated in the accompanying drawings.

A represents the floor upon which the organ case B is placed. The chamber C below should be in close proximity to the motor, generally in the basement or cellar of the building. D is the valve cylinder. Its construction, clearly illustrated in fig. 3, is as follows: E the inlet, and F the outlet; G the plug, fitted to the cylinder D, the interior of which is of conical form. From each end of the plug G a spindle, H, extends outward through a stuffing-box, I. The said stuffing-box I is formed on a plate, K, which said plate rests on a shoulder in the ends of the cylinder, not closely fitted in the said shoulder, so that the bearing of the plug comes entirely within the cylinder; and if, perchance, the spindles in the plug are not perfectly concentric with the stuffing-box I, the plates K will yield or move in their bearings, so as to prevent friction in the stuffing-boxes. Over the joint around the plates K I place a ring of any suitable packing, $a$, and on to these turn nuts L to hold the plates K in their proper position. At one end of the valve, say at the right hand, I place a nut and jambnut upon the spindle H within the stuffing-box, so as to draw the plug G into its proper position; and over the bearing or stuffing-box I turn a cap, $h$, which bears against the end of the spindle H, to hold it back and prevent the plug from jamming into the cylinder. It should be observed that in turning the nuts on to the spindle I do not draw the plug hard into the cylinder, but leave a little play, so that the plug will turn perfectly free and frictionless in its cylinder. The bearing, therefore, of the plug is upon the end of the stuffing-box or bearing I, and the cap $h$. Upon the other end I attach a lever, M, to the spindle, by which the valve is moved. Through the plug G is formed an opening, N, corresponding to the outlet and inlet F and E, so that when the plug is turned a direct and full passage is formed through the valve, as denoted by the red lines. This completes the construction of the valve and the first part of my invention. It is placed upon the pipe leading to or near the motor, so that by operating the valve the water may be let on in full or any required quantity, or cut off entirely, as the case may be. From the lever M a rod, O, passes up, and is connected by a bell-crank, P, or other device, to a rod, R, which passes along near the floor of the organ, as seen in fig. 1, or other convenient position. S S are two levers, forming a kind of toggle, one end of which is hung to the floor at $b$, or other fixed position, the other attached to a slide on the rod R; and upon the rod R is fixed a collar, $c$, against which the slide bears, so that when depressed, as denoted in black, fig. 1, the rod R is moved to close the valve, or when raised, as denoted in red, the weight T on the lever M will cause the rod R to move back and permit the opening of the valve, as denoted in red, figs. 1 and 2. The toggle S is connected by a rod, U, to a stop or register, V, as seen in fig. 2, so that by drawing out the stop in the usual manner, as denoted in red, the valve is open to admit the water to the motor, or when pushed in, as denoted in black, the valve is closed and the water cut off. This completes the second part of my invention. In fig. 1 the bellows is denoted in blue as filled to the required point. From the rod R, in any convenient position, a perpendicular rod, W, extends up above the top of the bellows through a support, d, and connected to the rod R by a bell-crank, or otherwise. On the rod W at the proper point I fix an arm, f, so that when the bellows is raised, as denoted in the drawing, it will strike the arm f, and raise the rod W, close the valve, and cut off the water. When the air is taken from the bellows, the rod W will fall and open the valve to admit more water; and thus, as more air is required, more power will be given to supply that air, but by no possibility can the bellows be raised beyond a certain point, and it is thus self-regulating as to the supply of air. It will be seen that it is important that the register should operate upon the same rod as does the rod W, so that when the stop is pushed in it will raise the rod W up to the closing point of the valve, and also so that when the bellows is depressed the drawing out of the stop will also draw down the rod W. This completes the third part of my invention.

Having thus fully described my invention, what I claim as new and useful, and desire to secure by Letters Patent, is—

1. The combination of the plates K K with the plug G and cylinder D of the valve, substantially in the manner and for the purpose herein set forth.

2. In combination with the plug G and its spindle H and bearing I, the cap h and the nut or nuts upon the spindle, substantially as and for the purpose set forth.

3. The combination of a regulator valve with an organ register, V, when constructed and arranged so as to operate substantially in the manner herein set forth.

4. The combination of the rod W, the register V, and the rod R with a regulator valve and the bellows, when constructed and arranged so that the register operates substantially as set forth.

WM. H. TOPHAM.

Witnesses:
JOHN E. EARLE,
A. J. TIBBITS.